United States Patent
Slaughter

(10) Patent No.: US 9,068,780 B2
(45) Date of Patent: Jun. 30, 2015

(54) TWIST VANE COUNTER-PARALLEL FLOW HEAT EXCHANGER APPARATUS AND METHOD

(71) Applicant: The Boeing Company, Chicago, IL (US)

(72) Inventor: Victor B. Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/767,231

(22) Filed: Feb. 14, 2013

(65) Prior Publication Data

US 2013/0192805 A1    Aug. 1, 2013

Related U.S. Application Data

(62) Division of application No. 11/868,202, filed on Oct. 5, 2007, now Pat. No. 8,381,804.

(51) Int. Cl.
| | |
|---|---|
| *F28F 9/22* | (2006.01) |
| *F28D 7/00* | (2006.01) |
| *F28D 7/16* | (2006.01) |
| *B23P 15/26* | (2006.01) |
| *F28D 7/02* | (2006.01) |

(52) U.S. Cl.
CPC .......... *F28D 7/0008* (2013.01); *Y10T 29/49389* (2015.01); *F28D 7/1692* (2013.01); *F28F 9/22* (2013.01); *B23P 15/26* (2013.01)

(58) Field of Classification Search
CPC ....... F28F 9/0202; F28F 9/0207; F28F 9/206; F28F 9/0263; F28F 9/0265; F28F 9/0268; F28F 9/0278; F28F 9/282; F28F 9/026; F28F 9/0282; F28F 9/02
USPC .......... 165/174, 175, 176, 78, 164, 165, 166, 165/167, 154, 156, 158; 137/561 A
See application file for complete search history.

(56) References Cited

U.S. PATENT DOCUMENTS

| | | | | |
|---|---|---|---|---|
| 1,974,110 | A * | 9/1934 | Higley | 138/39 |
| 2,092,835 | A * | 9/1937 | Edwards | 165/300 |
| 2,418,191 | A * | 4/1947 | Parrish | 165/156 |
| 2,812,165 | A * | 11/1957 | Hammond | 165/166 |
| 3,223,155 | A * | 12/1965 | Hubbard | 165/176 |
| 3,363,681 | A | 1/1968 | Revilock et al. | |
| 3,460,611 | A | 8/1969 | Tramuta et al. | |
| 4,524,823 | A | 6/1985 | Hummel et al. | |
| 4,913,776 | A * | 4/1990 | Finnemore et al. | 165/166 |
| 5,029,639 | A | 7/1991 | Finnemore et al. | |
| 5,265,673 | A | 11/1993 | Hucsko | |
| 6,179,051 | B1 * | 1/2001 | Ayub | 165/167 |
| 6,896,043 | B2 | 5/2005 | Dunn | |
| 7,806,171 | B2 * | 10/2010 | Taras et al. | 165/174 |

(Continued)

FOREIGN PATENT DOCUMENTS

JP        04020733      12/2007

*Primary Examiner* — Tho V Duong
(74) *Attorney, Agent, or Firm* — Patterson & Sheridan, LLP

(57) ABSTRACT

A method for forming a manifold for use with a heat exchanger is disclosed. The method may involve forming a plurality of vanes. Opposing surfaces of each of the vanes may define a pair of adjacent flow channels for receiving portions of first and second fluids to be flowed through the flow channels. Each of the flow channels may have a changing aspect ratio along its length.

19 Claims, 13 Drawing Sheets

(56) References Cited

U.S. PATENT DOCUMENTS

| | | |
|---|---|---|
| 8,381,804 B2 | 2/2013 | Slaughter |
| 2005/0126746 A1 | 6/2005 | D'Souza |
| 2006/0174611 A1 * | 8/2006 | Dilley et al. .................. 60/320 |

* cited by examiner

TWIST VANE COUNTER-PARALLEL FLOW HEAT EXCHANGER APPARATUS AND METHOD

CROSS-REFERENCE TO RELATED APPLICATIONS

This application is a divisional of U.S. patent application Ser. No. 11/868,202 filed on Oct. 5, 2007. The entire disclosure of the above application is incorporated herein by reference.

FIELD

The present disclosure relates to heat exchangers, and more particularly to heat exchanger having a manifold design that enables a counter-parallel flow of fluids, as well as increased surface contact area for the fluids, that contributes to increased heat exchange efficiency without significantly adding to the manufacturing complexity of the manifold.

BACKGROUND

The statements in this section merely provide background information related to the present disclosure and may not constitute prior art.

Heat exchangers are traditionally used to transfer heat from one fluid flowing therethrough to a different medium, for example to air or to a different fluid. Heat exchangers that attempt to provide a counter flowing arrangement, where the fluid to be cooled is flowed in a direction opposite to a cooling fluid, have generally proved to be quite complex and expensive to manufacture, or of limited effectiveness in increasing the heat exchange performance of the device. The manifolds used with such devices have typically been even more expensive and complex to construct than the heat exchanger core of the apparatus. A heat exchanger having improved cooling efficiency, that does not add appreciably to the overall cost or complexity of the apparatus, nor specifically to the cost and complexity of the manifolds used therewith, would be highly advantageous.

SUMMARY

In one aspect the present disclosure relates to a method for forming a manifold for use with a heat exchanger is disclosed. The method may involve forming a plurality of vanes. Opposing surfaces of each of the vanes may define a pair of adjacent flow channels for receiving portions of first and second fluids to be flowed through the flow channels. Each of the flow channels may have a changing aspect ratio along its length.

In another aspect the present disclosure may relate to a method for exchanging heat. The method may comprise providing a heat exchanger core and using a manifold in fluid flow communication with the heat exchanger core. The manifold may be used to receive a first fluid to be cooled and a second fluid to absorb heat from the first fluid. A plurality of vanes within the manifold may be used to define a plurality of first and second parallel arranged flow channels. Each of the first and second flow channels may have a changing aspect ratio along its length. The first flow channels may further each form a spiral flow path along their lengths. The first fluid may be flowed through the first flow channels and, simultaneously, the second fluid may be flowed through the second channels.

In still another aspect the present disclosure relates to a method for exchanging heat. The method may comprise providing a heat exchanger core and using a manifold in fluid flow communication with the heat exchanger core to receive a first fluid to be cooled and a second fluid to absorb heat from the first fluid. The method may further involve using a plurality of vanes within the manifold to define a plurality of first and second parallel arranged flow channels, and such that each of the first and second flow channels has a changing aspect ratio along its length. The method may further involve configuring the first flow channels to each form a spiral flow path along their lengths. The first fluid flow may be flowed through the first flow channels. Simultaneously, the second fluid may be flowed through the second flow channels and further such that the first and second fluids flow in a spiral path over lengths of the first and second flow channels. The method may further involve flowing said first and second fluids such that adjacent flowing portions of said first fluid are separated by portions of said second fluid.

BRIEF DESCRIPTION OF THE DRAWINGS

The drawings described herein are for illustration purposes only and are not intended to limit the scope of the present disclosure in any way.

DETAILED DESCRIPTION

Figure 1:
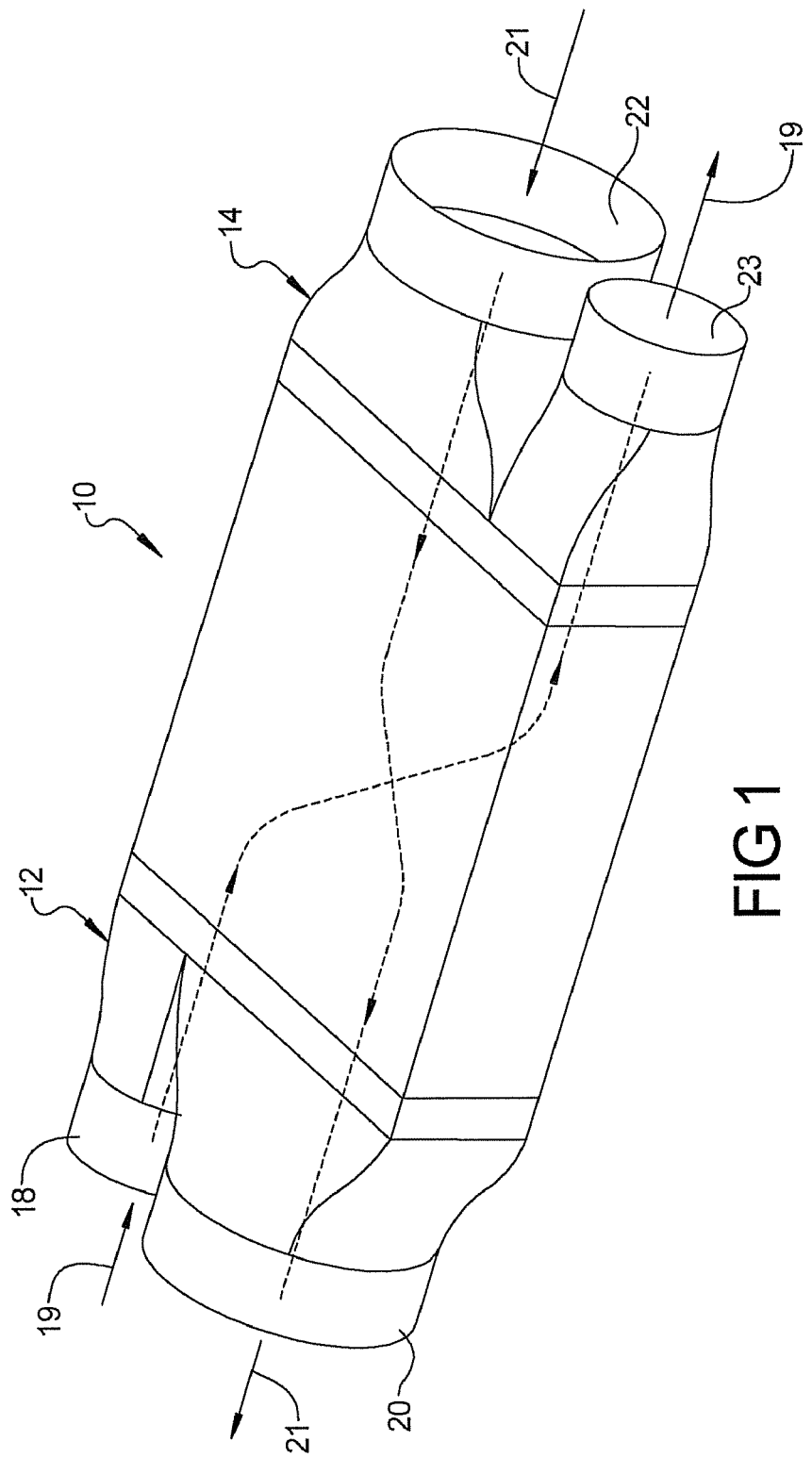
FIG. 1 is a perspective view of one embodiment of a heat exchanger in accordance with the present disclosure that includes a counter-parallel-flow manifold.

Referring to FIG. 1, a heat exchanger 10 in accordance with one embodiment of the present disclosure is illustrated. The heat exchanger in this example includes manifolds 12 and 14 that are arranged on opposite sides of a heat exchanger core 16. In this example the manifolds 12 and 14 are identical in construction, but they need not be. It will be appreciated also that the dimensions and construction of the heat exchanger core 16 will dictate, at least in part, the outer dimensions of the manifolds 12 and 14, as well as their dimensions.

In FIG. 1 manifold 12 has an inlet 18 and an outlet 20. Manifold 14 similarly has an inlet 22 and an outlet 23. In this example the inlets and outlets have different diameters, but they could just as readily have the same diameter. In general operation, a fluid 19 may enter the inlet 18 of manifold 12 and circulate through the heat exchanger core 16, where a major portion of heat transfer occurs to a cooling medium 21, before the fluid exits outlet 23. The cooling medium 21 may flow from inlet 22 to outlet 20, and counter and parallel to the fluid 19. The cooling medium 21 may be comprised of a liquid, a gas or any other fluid cooling medium that is flowable and capable of assisting in absorbing heat from the fluid entering inlet 18. Similarly, fluid 19 may be comprised of a liquid, a gas or any other flowable medium that requires cooling.

Figure 2:
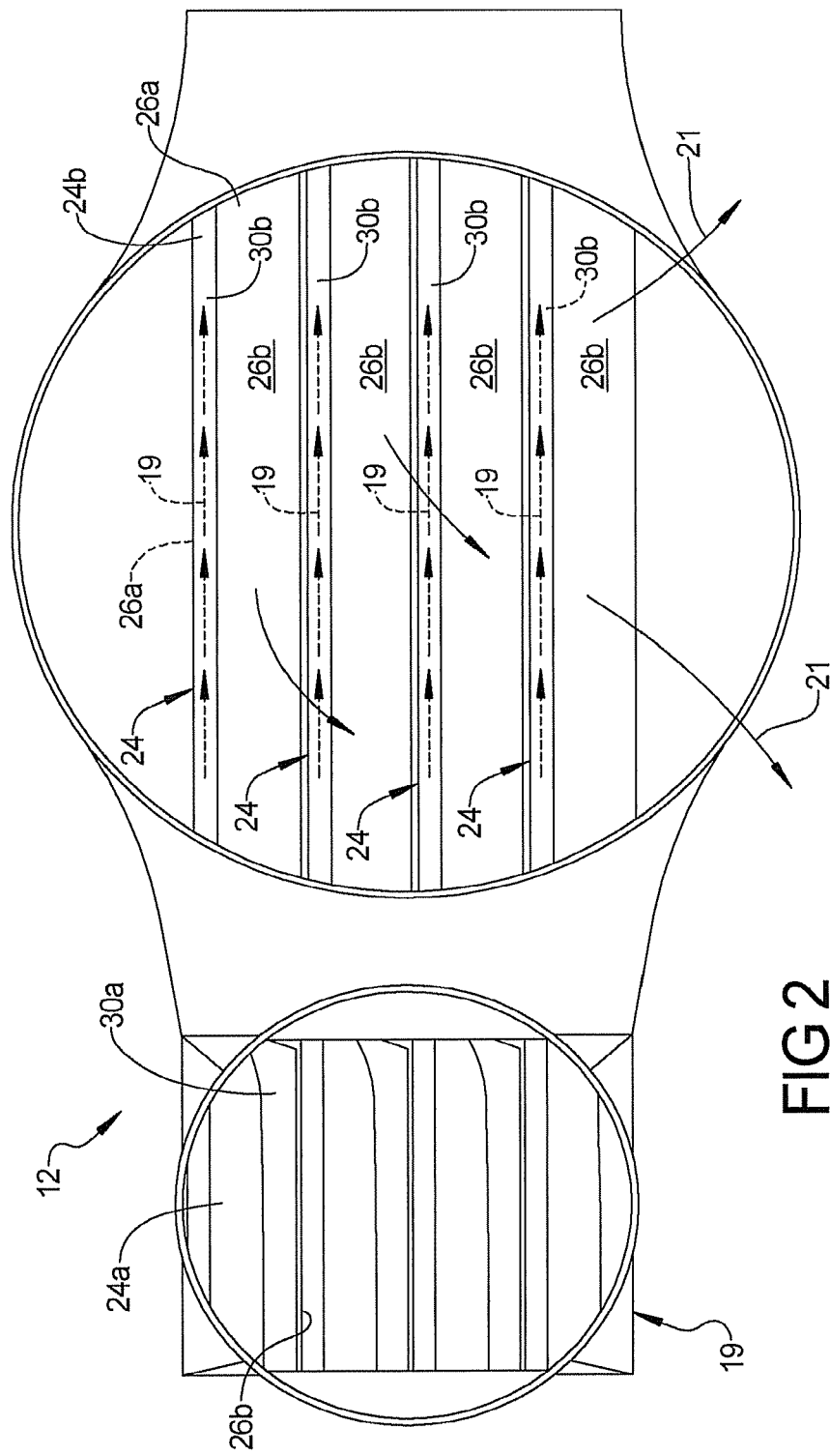
FIG. 2 is a view in accordance with directional line 2 in FIG. 1 looking directly into a manifold of the heat exchanger, and further illustrating how fluid may flow into an inlet port of the manifold and be deflected upwardly and to the right by the construction of vanes within the manifold.
Figure 3:
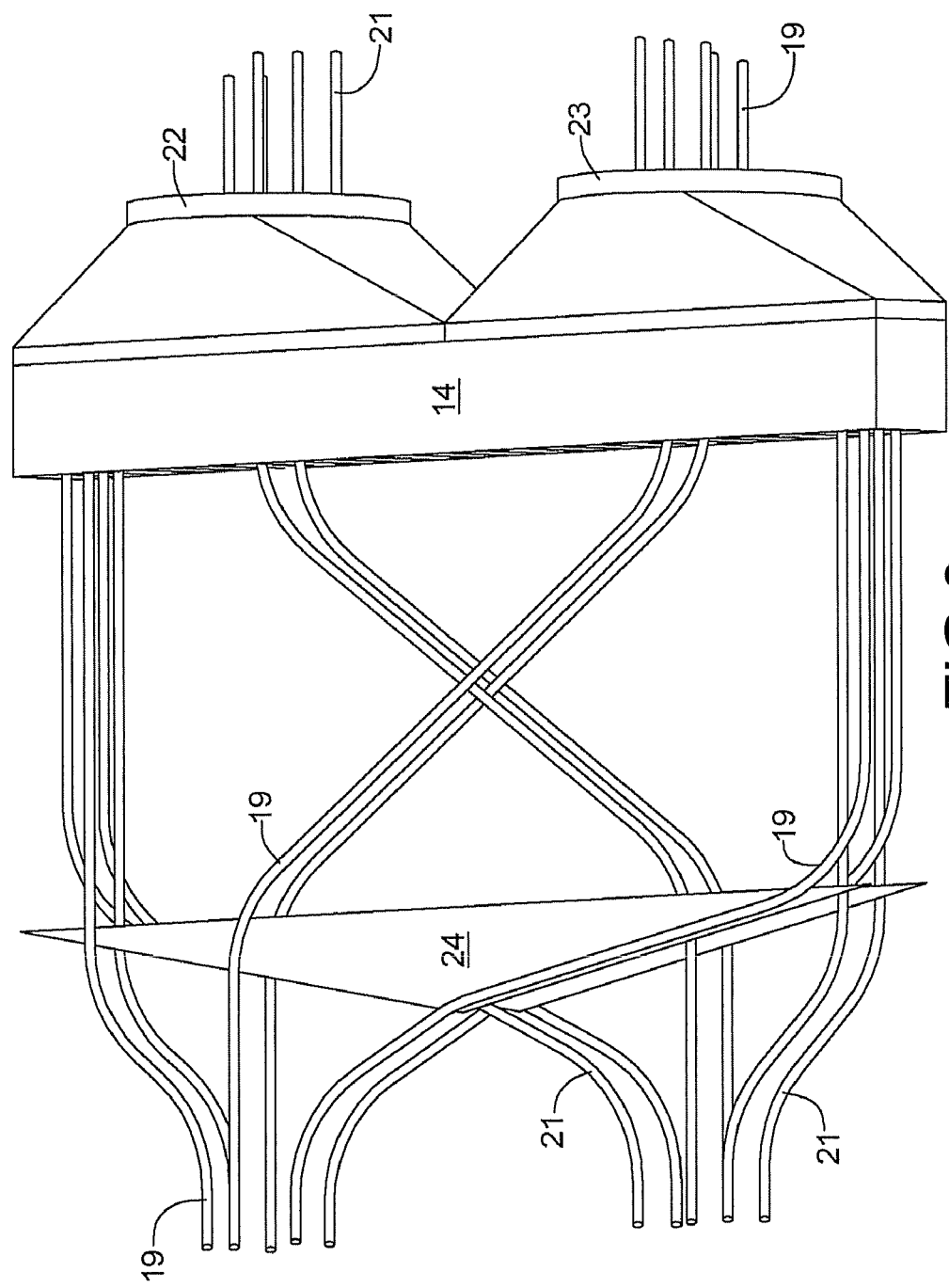
FIG. 3 is a highly simplified plan representation of the heat exchanger of FIG. 1, but with a portion of the left manifold removed to illustrate the fluid flow paths of the counter-parallel flow arrangement that the heat exchanger provides.
Figure 4:
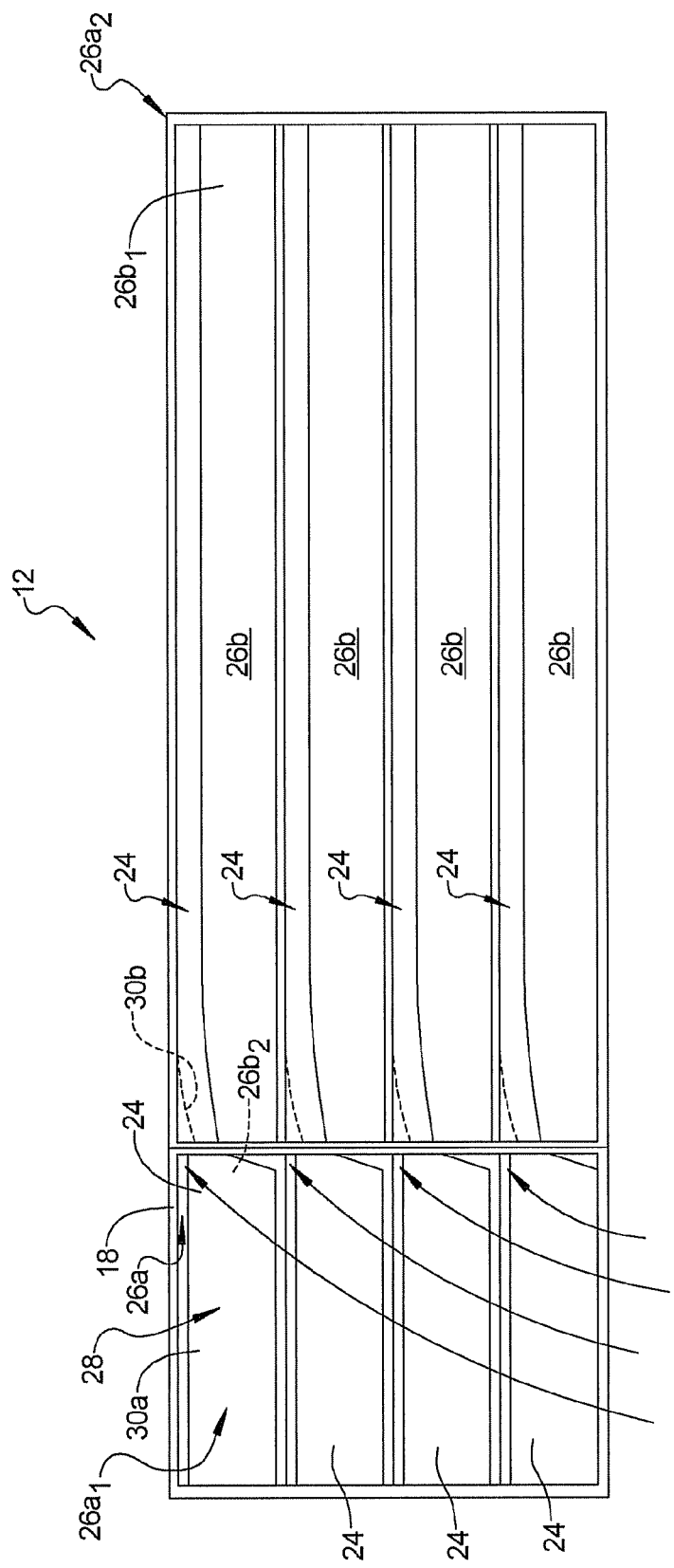
FIG. 4 is a view of the vanes taken from the perspective of FIG. 2, with the inlet and outlet structure removed to better illustrate the spacing of the vanes and their external shape.
Figure 5:
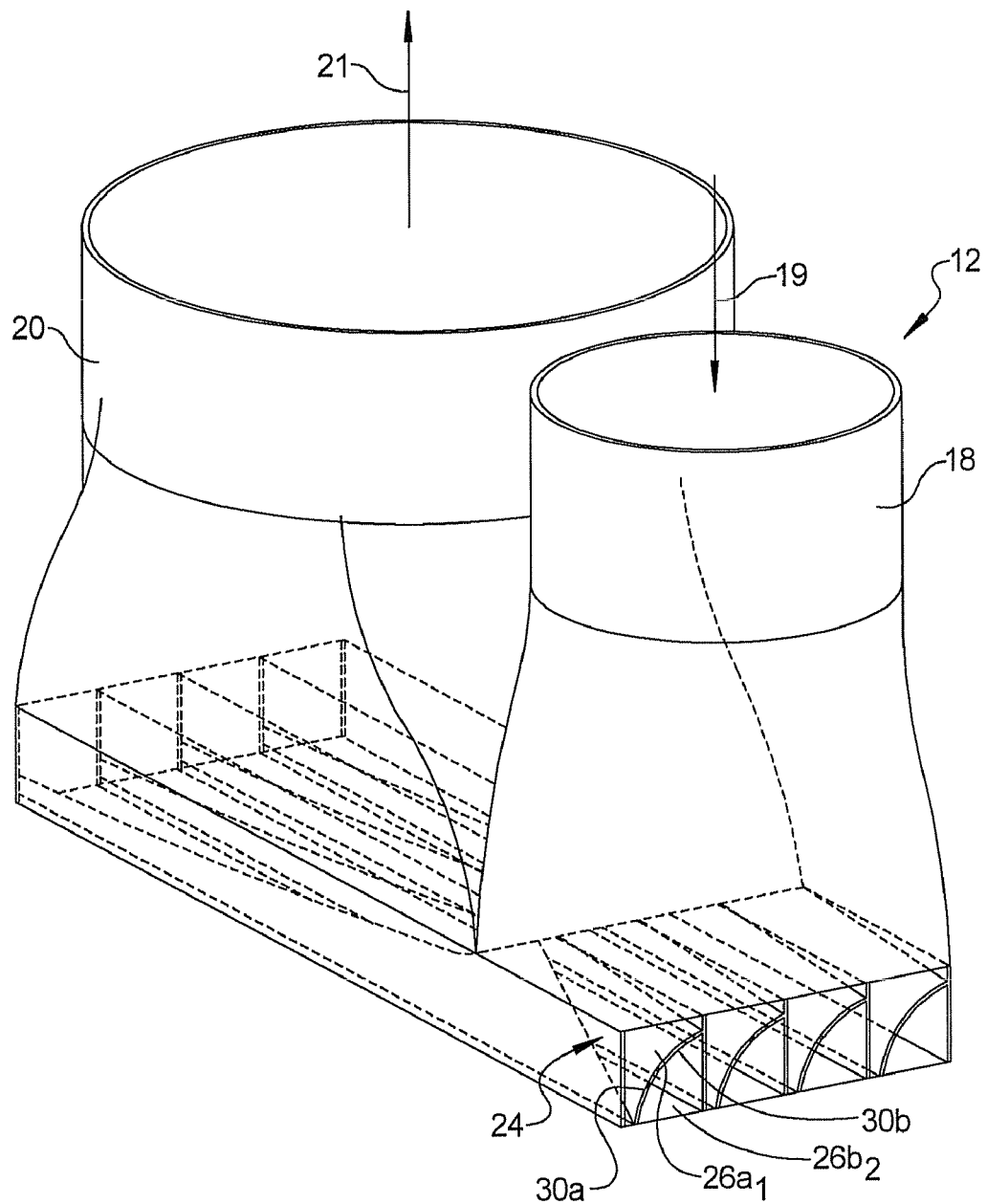
FIG. 5 is a partial perspective view of one manifold of the heat changer with a portion of its wall structure broken away to help illustrate the shape of the vanes.
Figure 6:
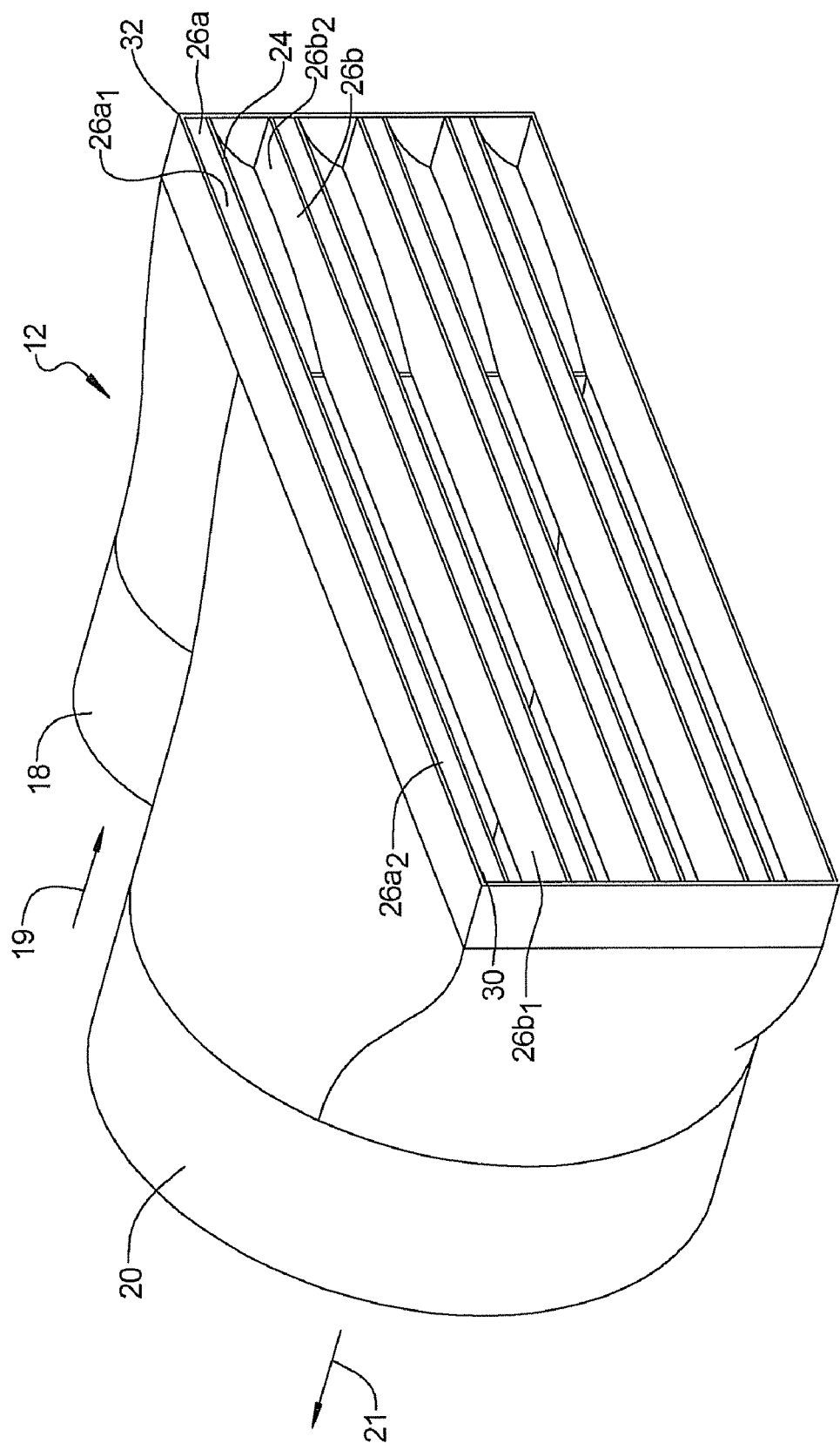
FIGS. 6 through 13 are cross sections through the manifold in FIG. 5 to illustrate the changing aspect ratio and changing orientation of the vane along its length.
Figure 7:
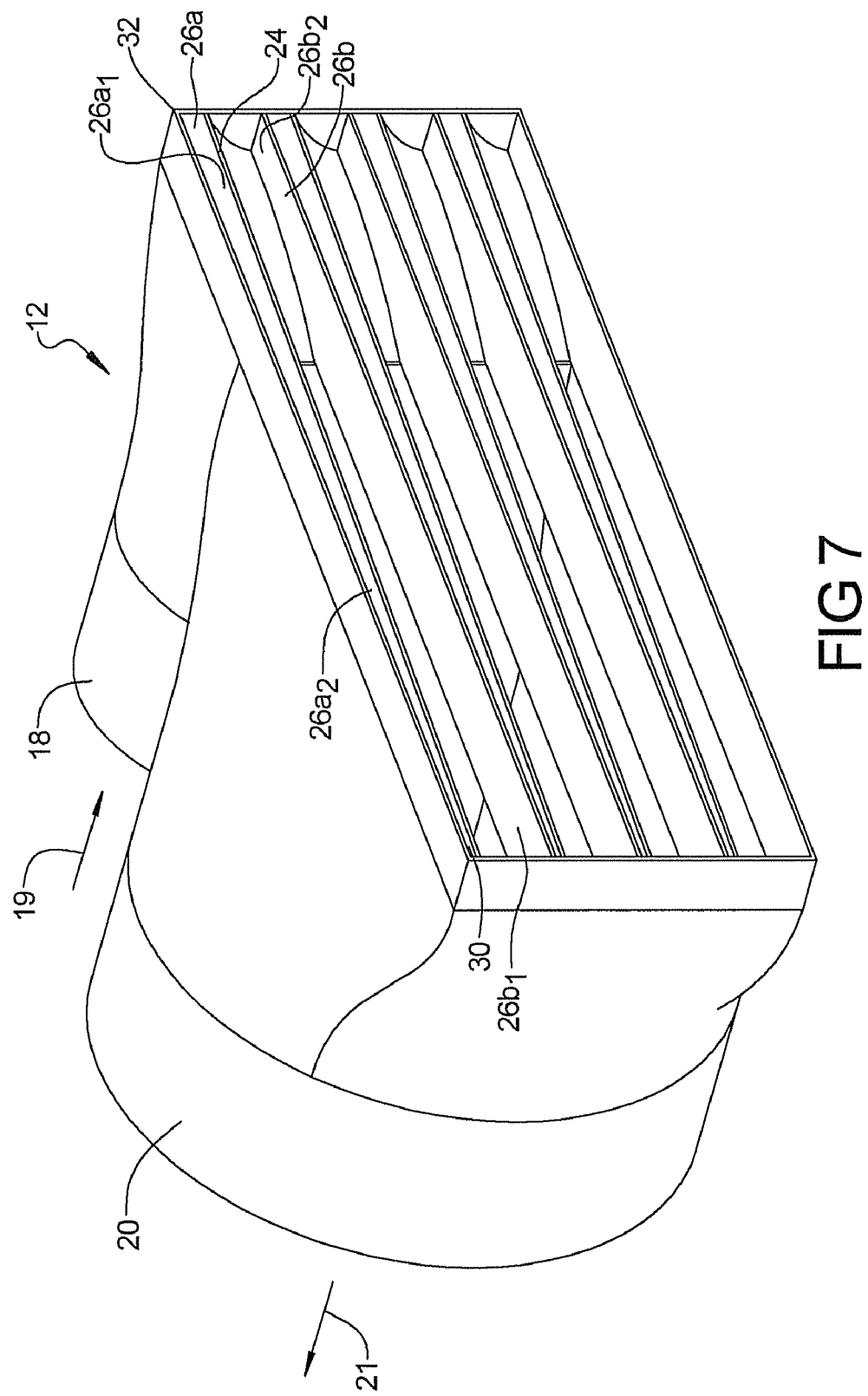
Figure 8:
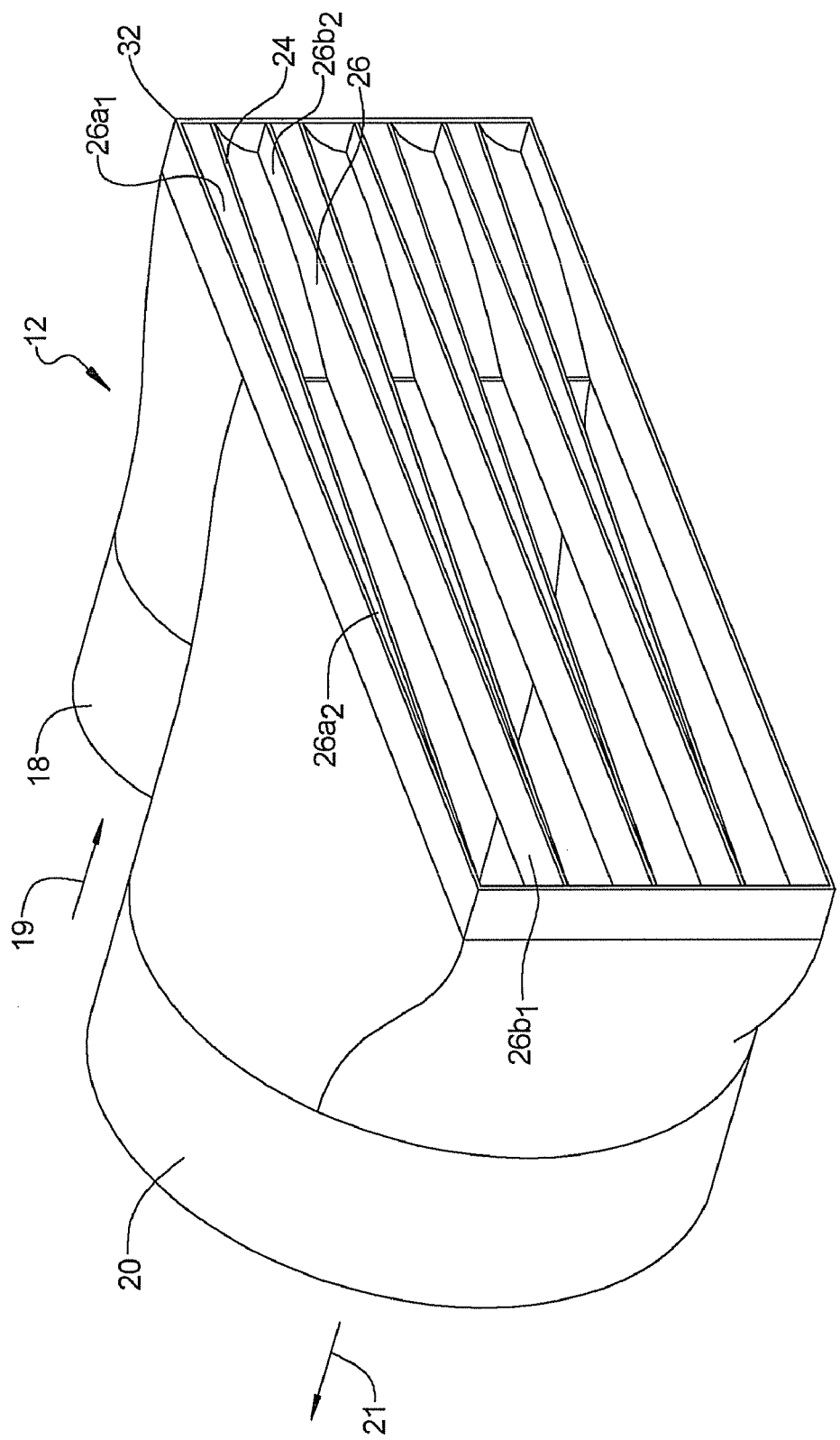
Figure 9:
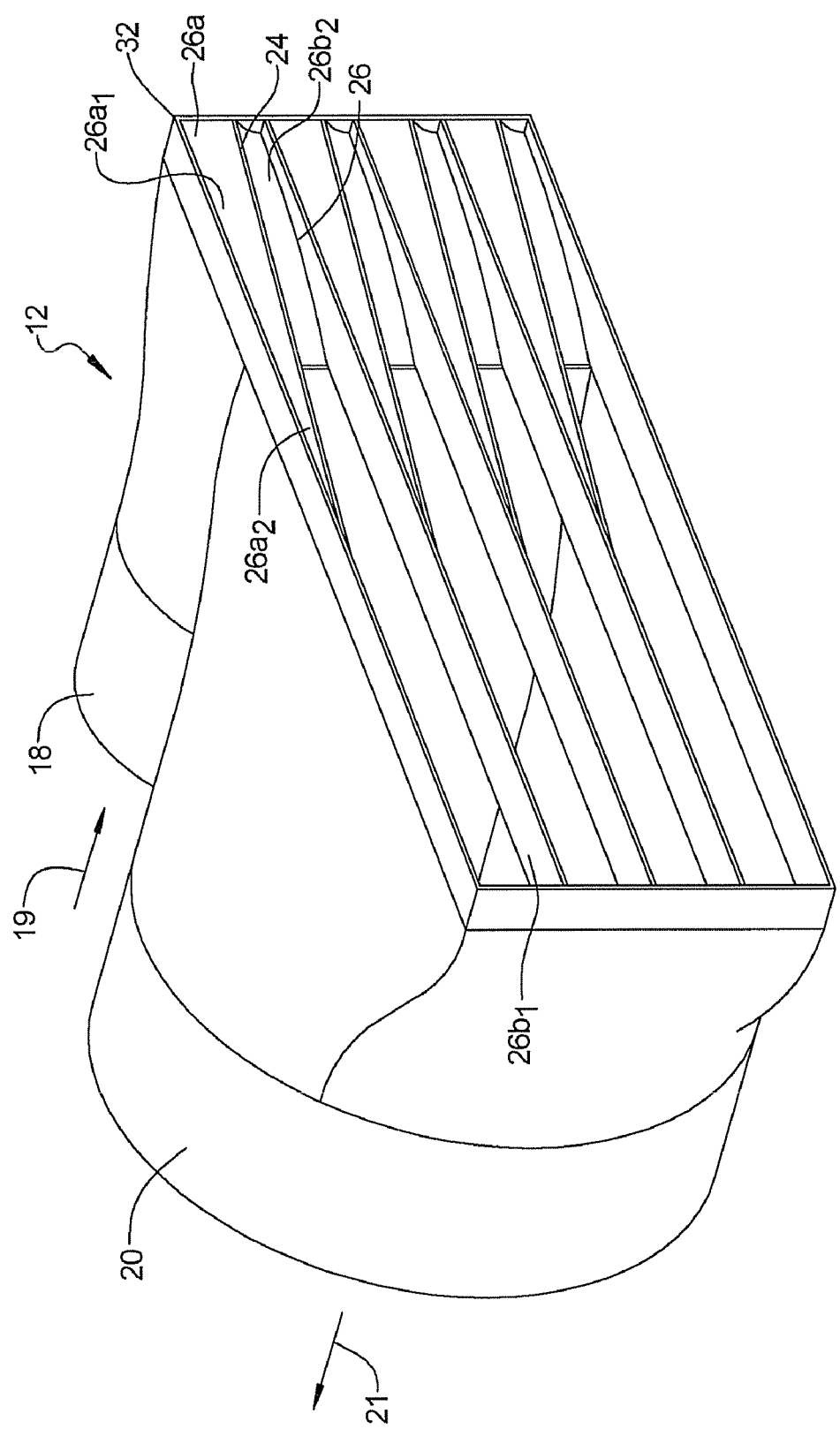
Figure 10:
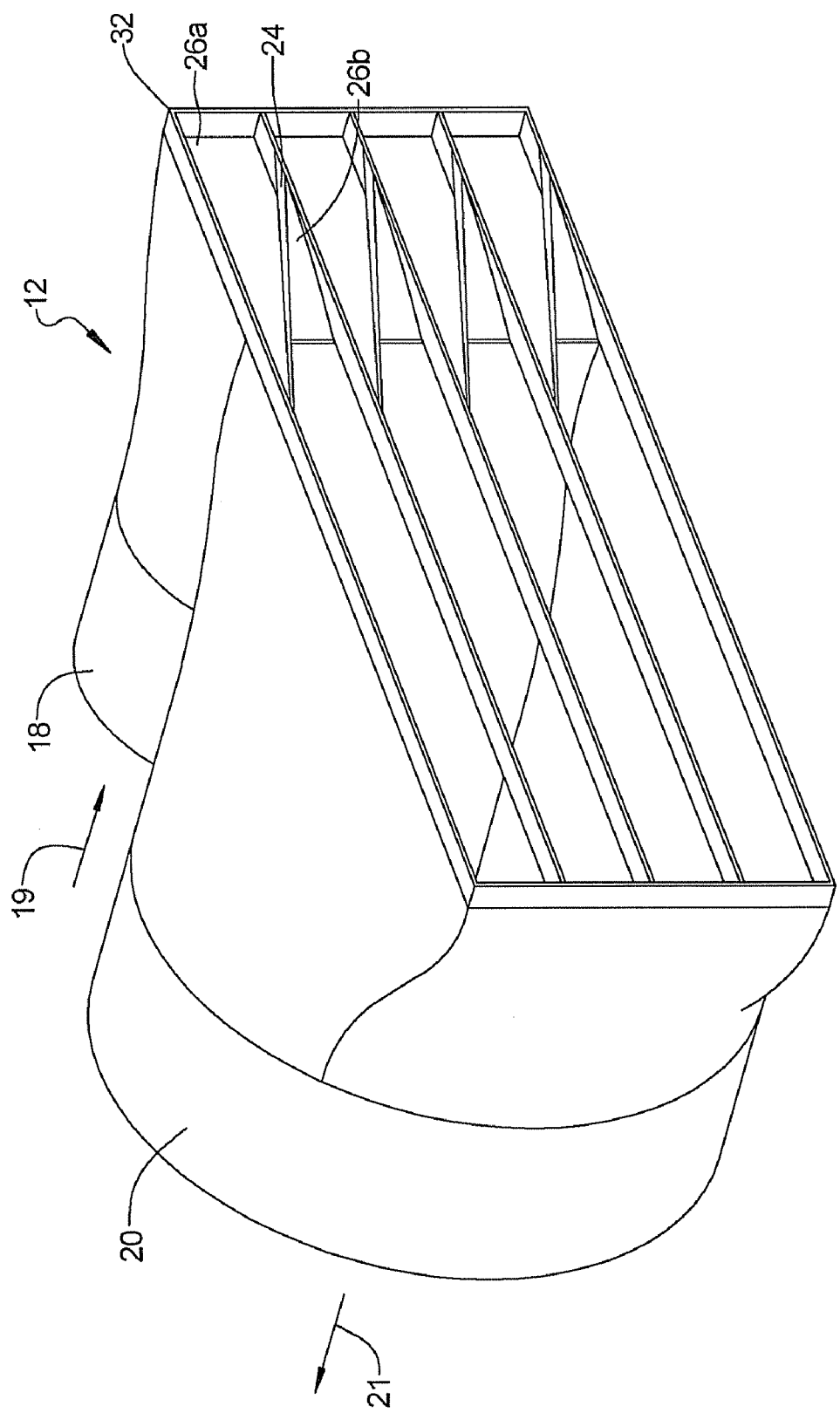
Figure 11:
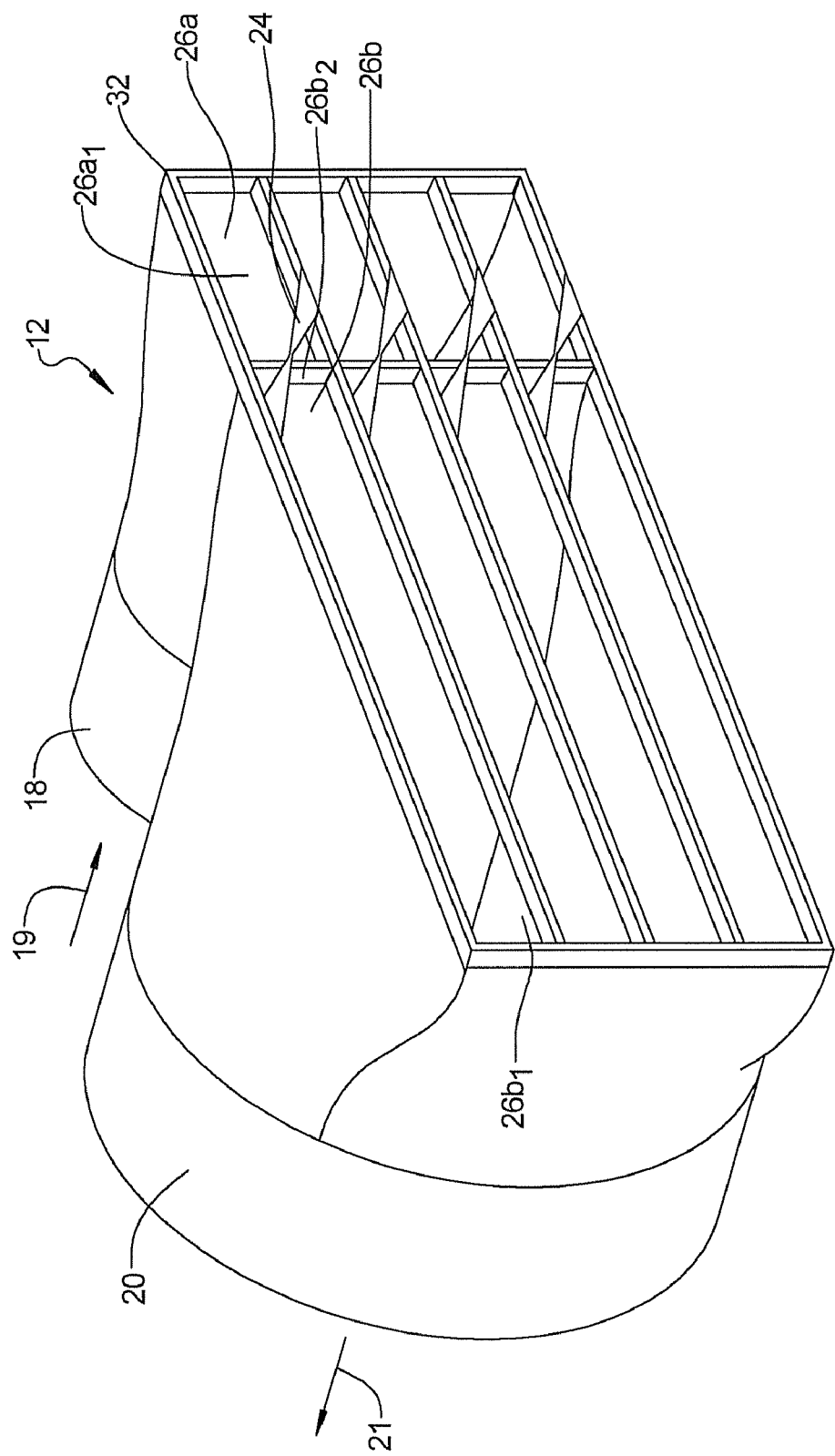
Figure 12:
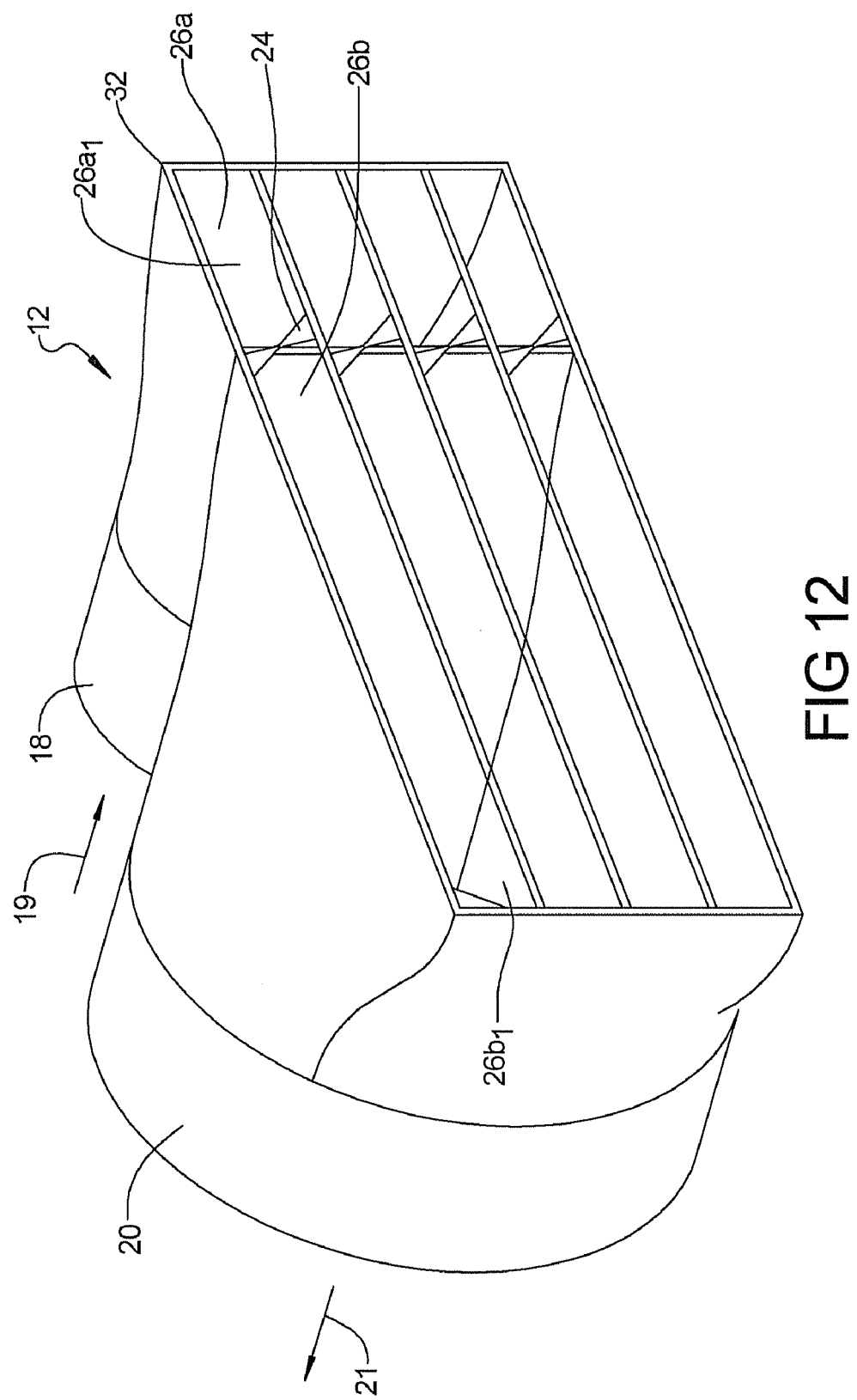
Figure 13:
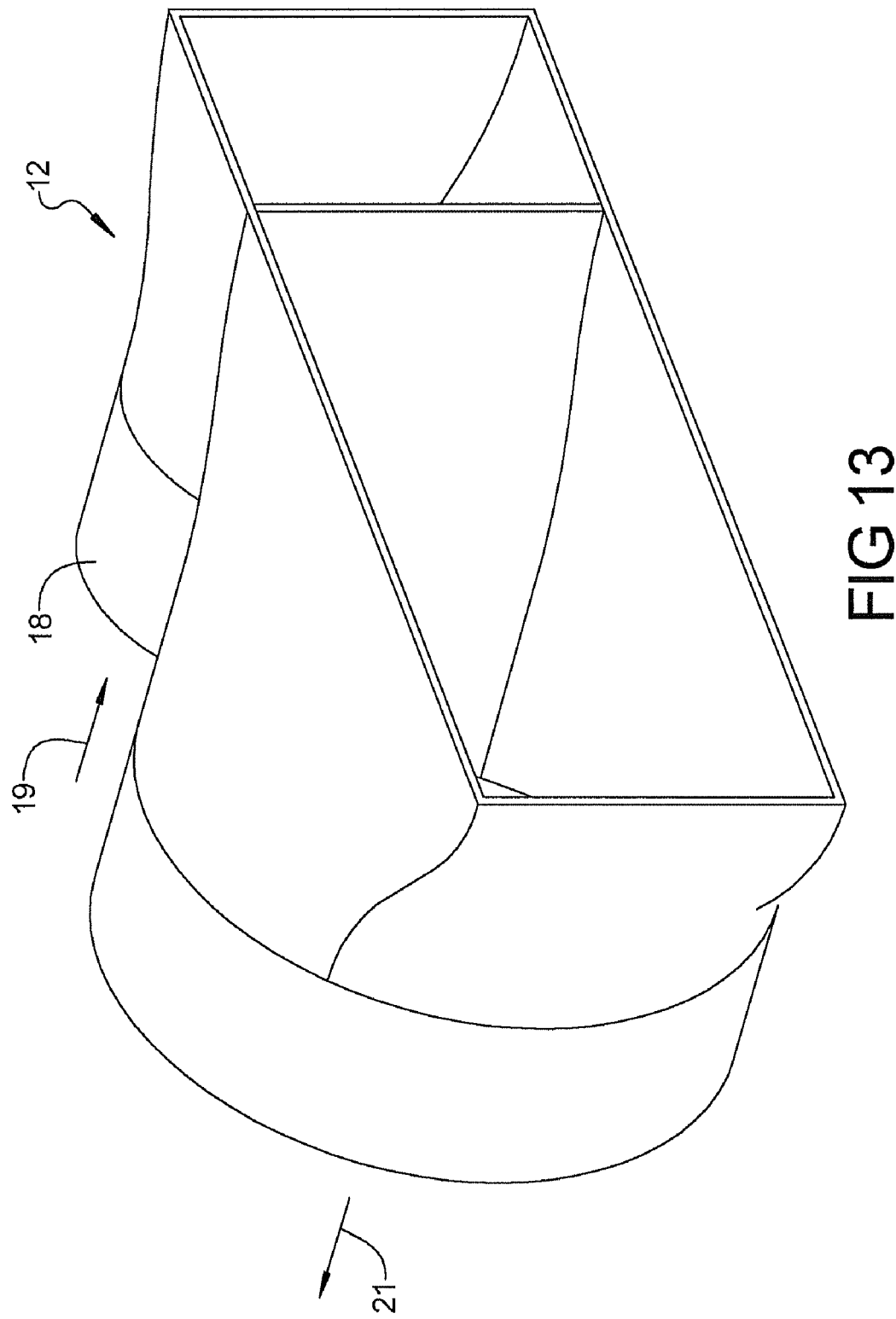

Referring to FIGS. 2 and 4, a portion of the interior construction of the manifold 12 can be seen from a view looking straight into the inlet port 18 and outlet port 20. Since manifolds 12 and 14 are identical in construction, only the construction of manifold 12 will be described in detail. Manifold 12 includes a plurality of vanes 24 that are arranged generally parallel to one another and spaced apart from one another. Each of the vanes 24 forms two adjacent flow channels, first flow channel 26a and second flow channel 26b. Each vane 24 further has a first end 24a and a second end 24b. First flow channel 26a enables fluid 19 to flow therethrough, while the adjacent second flow channel 26b enables the cooling medium 21 to flow therethrough counter to, but generally parallel to, the fluid 19. Each of channels 26a has an input end 26a1 and an output end 26a2, and each of channels 26b has an input end 26b1 and an output end 26b2. FIG. 3 further schematically illustrates the counter flowing paths that the fluid 19 and the cooling medium 21 may take within the heat exchanger core 16. It can also be seen From FIGS. 2 and 3 that the flow paths for the fluid 19 and the cooling medium 21 are arranged in alternating fashion to maximize heat transfer from the fluid 19 to the cooling medium 21. Opposing surface portions 30a and 30b (FIGS. 2 and 5) of each vane 24 help to define the flow channels 26a and 26b.

It is a benefit that the sum of cross sectional areas of all of the channels 26a and 26b defined by the vanes 24 approximately equals the cross sectional area of the inlet 18. This is advantageous for maintaining a constant pressure in each manifold 12 and 14, and avoiding a pressure drop across the heat exchanger 10. However, it will be appreciated that if the needs of a particular application should dictate, that this ratio could be varied so that a greater or lesser cross sectional flow path area is provided for by the vanes 24. Additionally, the first and second fluids 19 and 21 could be flowed in the same direction if desired.

Referring to FIG. 4, when the fluid 19 enters the inlet 18 and begins to flow into the first flow channel 26a, a ramp portion 28 of each vane 24 deflects the fluid vertically and also turns the fluid 19 about a twisting or spiral path as the fluid 19 begins to flow into the first flow channel 26a. Conversely, cooling fluid 21 returning to manifold 12 from the other manifold 14 will be deflected downwardly by each vane 24 as it enters the adjacent, second flow channel 26b, and will flow along the second flow channel 26b in a twisting or spiral path, but in the opposite sense as the fluid 19 flowing through the first flow channel 26a.

From FIGS. 5-13, the cross-sectional shape and orientation of the two adjacent flow channels (i.e., paths) 26a and 26b formed by each vane 24 can be seen to change along the length of the vane. In FIGS. 6-12, the wall portion bridging vane 24 and wall portion 32 of the manifold 12 has been removed to reveal the interior area that forms the first flow channel 26a.

In particular, it will be noted that the aspect ratios (i.e., ratio of height-to-width) of the two adjacent flow channels 26a and 26b defined by the vane 24 both change over the length of the vane in a similar but opposite (i.e., mirror image) sense. This enables a counter-parallel-flow path configuration to be created. The adjacent flow channels 26a and 26b formed by each vane 24 also help to direct a greater portion of each the fluids 19 and 21 into contact with opposing wall surfaces of the vane 24 as each fluid flows through its respective flow channel 26a or 26b within the manifold 12, thus ensuring more efficient cooling of the fluid 19.

The manifolds 12 and 14, and particularly the vanes 24, may be made from any suitable materials that enable excellent thermal conduction between the fluid 19 and the cooling medium 21. Suitable materials are aluminum, titanium, steel, etc., but it will be appreciated that any suitable having reasonably good thermal conductivity may potentially be employed. The specific materials employed for the manifolds 12 and 14 may also depend in part on the specific types fluid that the manifolds will be used with.

It will also be appreciated that the precise cross sectional shape and twisting orientation of the vanes 24 may be modified to suit the needs of a particular application. Also, the total cross sectional area of the vanes 24 relative to the flow paths 26 may be varied to be suit the needs of a particular application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for forming a manifold for use with a heat exchanger core, comprising:
   disposing a plurality of vanes proximate to an interface end of a wall structure and within a fluid passageway which is defined by the wall structure, the wall structure includes an inlet end and the interface end,
   wherein the interface end forms an opening to the fluid passageway and is configured to connect with the heat exchanger core,
   wherein each of the plurality of vanes extends transversely across the opening from a respective first end of the vane at a first location of the wall structure to a respective second end of the vane at a second location of the wall structure, wherein opposing surfaces of each of the plurality of vanes define a pair of adjacent flow channels within the fluid passageway for receiving portions of first and second fluids to be flowed simultaneously through the pair of adjacent flow channels, said second fluid being used to cool said first fluid, and
   wherein each of the pair of adjacent flow channels has a changing aspect ratio along its length within the manifold such that each of said pair of adjacent flow channels is twisted to form a spiral flow path along its said length within the manifold.

2. The method of claim 1, further comprising forming the pair of adjacent flow channels to be generally parallel to each other.

3. The method of claim 2, further comprising arranging each of the pair of adjacent flow channels in alternating fashion so as to be configured to enable opposite longitudinal flow directions for adjacent portions of said first and second fluids.

4. The method of claim 2, further comprising arranging each of the pair of adjacent flow channels in alternating fashion so as to enable a same flow direction for adjacent portions of said first and second fluids.

5. A method, comprising:
   receiving, with a manifold in fluid flow communication with a heat exchanger core a first fluid to be cooled at the heat exchanger core and a second fluid previously heated at the heat exchanger core, wherein the manifold comprises a wall structure defining a fluid passageway, the wall structure includes an inlet end and an interface end, wherein the interface end forms an opening to the fluid passageway and is configured to connect with the heat exchanger core; and directing, using a plurality of vanes disposed within the fluid passageway and proximate the interface end, the first fluid to the heat exchanger core through a plurality of first flow channels and the second fluid from the heat exchanger core through a plurality of second flow channels, wherein each of the plurality of vanes extends transversely across the opening from a respective first end of the vane at a first location of the wall structure to a respective second end of the vane at a second location of the wall structure, and the plurality of vanes defines the plurality of first and second flow channels in a parallel arrangement, and such that each of the plurality of first and second flow channels has a changing aspect ratio along its length within the manifold, and the plurality of first flow channels each form a spiral flow path along their lengths within the manifold.

6. The method of claim 5, further comprising flowing, using the plurality of second flow channels, the second fluid in a spiral path.

7. The method of claim 5, further comprising:
forming, using an outer surface of each of said plurality of vanes, the plurality of first and second flow channels; and
flowing, through the plurality of first and second flow channels, said first and second fluids in directions which are counter and parallel to one another.

8. The method of claim 5, further comprising cooling, at the heat exchanger core, the second fluid with the first fluid.

9. The method of claim 5, further comprising directing the first fluid, with the plurality of vanes, such that portions of said first fluid are sandwiched between portions of said second fluid.

10. The method of claim 5, further comprising:
directing, using an additional manifold in fluid communication with said heat exchanger core, the first fluid from the heat exchanger core and the second fluid to the heat exchanger core,
wherein the heat exchanger core is disposed between said manifold and said additional manifold.

11. The method of claim 5, further comprising:
using an inlet of said manifold, in flow communication with all of said plurality of first flow channels, to receive said first fluid from an external source, and wherein the plurality of first flow channels each have a second end; and
configuring a cross sectional area of said inlet so that said cross sectional area is approximately equal to a collective cross sectional area of all of said second ends of said plurality of first flow channels.

12. The method of claim 11, further comprising flowing each portion of the first fluid over ramp portions of said first flow channels to deflect and turn said portion of said first fluid entering each of said plurality of first flow channels.

13. A method, comprising:
receiving first and second fluids respectively at first and second inlets of first and second manifolds, wherein the first and the second manifolds respectively include first and second wall structures defining respective first and second fluid passageways, the first and the second wall structures respectively include first and second inlet ends and respectively include first and second interface ends, wherein the first and the second interface ends form respective first and second openings to the first and the second passageways, and the first and the second openings are configured to connect with a heat exchanger core;
directing respectively, with a plurality of first and second vanes respectively disposed within the first and the second fluid passageways proximate to the first and the second interface ends, the first and the second fluids to the heat exchanger core in respective spiral paths through the first and the second manifolds, wherein each of the plurality of first vanes extends transversely across the first opening from a respective first end of the first vane at a first location of the first wall structure to a respective second end of the first vane at a second location of the first wall structure, and each of the plurality of second vanes extends transversely across the second opening from a respective first end of the second vane at a first location of the second wall structure to a respective second end of the second vane at a second location of the second wall structure;
transferring heat between the first and the second fluids at the heat exchanger core; and
directing, with the plurality of second and first vanes, the first and the second fluids from the heat exchanger core to outlets of the second and the first manifolds.

14. The method of claim 13, further comprising changing aspect ratios of cross sectional areas of flows of the first and the second fluids respectively through the first and the second manifolds.

15. The method of claim 13, further comprising directing the first and the second fluids through the second and the first manifolds in respective paths having changing aspect ratios.

16. The method of claim 13, wherein the directing the first and the second fluids to the outlets includes providing contact between the first and the second fluids respectively with opposing surface portions of the plurality of first and second vanes.

17. The method of claim 16, further comprising directing the first and the second fluids to and from the heat exchanger core along paths including rectangular cross-sections at the first and the second interface ends.

18. The method of claim 16, wherein adjacent ones of the plurality of first vanes separate one of:
a portion of the first fluid from portions of the second fluid; and
a portion of the second fluid from portions of the first fluid.

19. The method of claim 18, wherein the first wall structure and the plurality of first vanes define pathways of the first and the second fluids at the first interface end.

* * * * *